United States Patent
Huntzicker (10) Patent No.: US 7,362,211 B2
(45) Date of Patent: Apr. 22, 2008

(54) REMOVABLY MOUNTED WIRELESS VEHICLE CONTROL AND METHOD

(75) Inventor: Fred W. Huntzicker, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 486 days.

(21) Appl. No.: 11/017,266

(22) Filed: Dec. 20, 2004

(65) Prior Publication Data

US 2006/0132286 A1 Jun. 22, 2006

(51) Int. Cl.
*H04Q 9/00* (2006.01)
*G08C 7/00* (2006.01)
*B60R 25/10* (2006.01)
*G06K 7/00* (2006.01)
*E05B 19/04* (2006.01)

(52) U.S. Cl. .................. 340/5.64; 340/5.62; 340/5.54; 340/928; 340/426.13; 340/825.69; 340/825.72; 235/486; 235/380; 70/408

(58) Field of Classification Search ............... 340/5.64, 340/5.62, 5.54, 928, 426.13, 825.69, 825.72; 235/486, 380; 70/408
See application file for complete search history.

(56) References Cited

U.S. PATENT DOCUMENTS

2003/0231550 A1* 12/2003 Macfarlane ................. 367/198

* cited by examiner

*Primary Examiner*—Brian Zimmerman
*Assistant Examiner*—Scott Au (57) ABSTRACT

Methods and apparatus are provided for securing a wireless fob in a vehicle. The fob has a control thereon for controlling a vehicle function. The system comprising a first vehicle region having an opening for receiving the fob. The opening is configured to render the control accessible from the exterior of the vehicle. A second vehicle region is capable of having first and second positions with respect to the first vehicle region. The opening receives the fob when the second vehicle region is in the first position. The second vehicle region prevents removal of the fob from the opening when the second vehicle region is in the second position.

16 Claims, 8 Drawing Sheets

REMOVABLY MOUNTED WIRELESS VEHICLE CONTROL AND METHOD

CROSS-REFERENCES TO RELATED APPLICATIONS

This application is related to U.S. application Ser. No. 10/643,731, entitled "KEYLESS ENTRY MODULE AND METHOD" filed on Aug. 18, 2003, hereinafter referred to as the "Reference Application," and is hereby incorporated in its entirety by reference.

TECHNICAL FIELD

The present invention generally relates to a keyless entry or activation system and method, and more particularly, a keyless entry or activation system and method suitable for vehicles or other equipment, which detachably mounts to the vehicle, or other equipment in a secure manner.

BACKGROUND

Modern vehicles and other equipment are often equipped for remote entry control using a fob-type key device. A fob-type key device is a small, pocket-sized, radio-frequency (RF) signaling device, usually attached to the same key ring holding the mechanical ignition key or other control key. By pressing a switch button on the fob-type key, the user is able to remotely open one or more of the doors and/or turn on a portion of the vehicle or other equipment without having to insert a mechanical key in a mechanical lock. This is a great convenience and an attractive safety feature. The fob-type keyless entry works by sending a coded RF signal to a receiver-decoder-actuator in the vehicle. This in-car system unlocks the door and/or performs other predetermined functions when it detects a valid "OPEN" code or equivalent on the RF signal received from the fob.

A disadvantage of such arrangement is that the fob-type key must be brought into the vicinity of the vehicle for it to function. Thus, the user must carry the fob-type key with him or her in order to be able to use it. Under these circumstances, the physical security of the fob-type key is essential for preventing unauthorized entry into the vehicle. If the fob is lost or stolen, vehicle security is compromised.

Sometimes vehicles are provided with key-less entry systems where the user only needs to remember a door code (e.g., a vehicle PIN number) and need not carry the electronic or mechanical key along. This eliminates the security risk arising from having to carry the key. Such key-less entry systems usually have the form of a small keypad built into the door of the car. To gain access to the vehicle, the user merely enters his or her personal entry code into the keypad and the door is automatically unlocked by the vehicle electronic system. A physical key or remote fob-type key is not needed. This arrangement is well known and very useful. However such keyless entry systems are still only in limited use and are usually available only as a hard-wired, "factory installed" option. "Factory installed" means that the components needed to provide the key-less entry function are hard-wired into the car at the time of construction and cannot be easily added afterward, for example, as a "dealer installed" or "after-market" option. This is a significant limitation.

In the Reference Application there is described a keyless entry or activation system that is easily installed after a vehicle or other equipment or structure is manufactured and that does not depend on a factory installed keypad or keypad wiring harness. However, a more flexible means of attaching the keyless entry system to the vehicle is desired, one that permits the keyless entry module to be quickly and easily attached to and removed from the vehicle by the user, rather than a service mechanic. It is further desired that the mounting means and method be secure, that is, such that once the vehicle or equipment is locked, the keyless entry module is accessible from the exterior of the vehicle but cannot be removed until the vehicle is again unlocked. Furthermore, other desirable features and characteristics of the present invention will become apparent from the subsequent detailed description and the appended claims, taken in conjunction with the accompanying drawings and the foregoing technical field and background.

BRIEF SUMMARY

A system for securing a wireless fob in a vehicle. The fob has a control for controlling a vehicle function. The system comprises a first vehicle region that has an opening to receive the fob. The opening is configured to render the control accessible from the exterior of the vehicle. The second vehicle region is capable of having first and second positions with respect to the first vehicle region. The opening receives the fob when the second vehicle region is in the first position. The second vehicle region prevents removal of the fob from the opening when the second vehicle region is in the second position.

A method is provided for attaching a wireless fob to a vehicle to control the functions of the vehicle. The vehicle has first and second adjacent portions capable of being opened and closed with respect to each other. The fob will mate with the first portion when the first and second portions are open will expose the control from the exterior of the vehicle. When closing the second portion with respect to the first portion it will secure the fob in and prevent removal of the fob from the first portion.

BRIEF DESCRIPTION OF THE DRAWINGS

The present invention will hereinafter be described in conjunction with the following drawing figures, wherein like numerals denote like elements.

FIG. 12A illustrates a first switch position and FIG. 12B illustrates a second switch position.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As used herein the word "vehicle" is intended to include any type of vehicle including but not limited to car, truck, trailer, plane, boat, motorcycle, bike and so forth, and any other type of equipment desired to be provided with an electronic entrance and/or activation key. As used herein, the words "keyless fob" and "fob" are intended to include but not be limited to fobs of the type described in the Reference Application having keypads or the like by which a user can enter a code to activate the fob and control corresponding vehicle systems.

Figure 1:
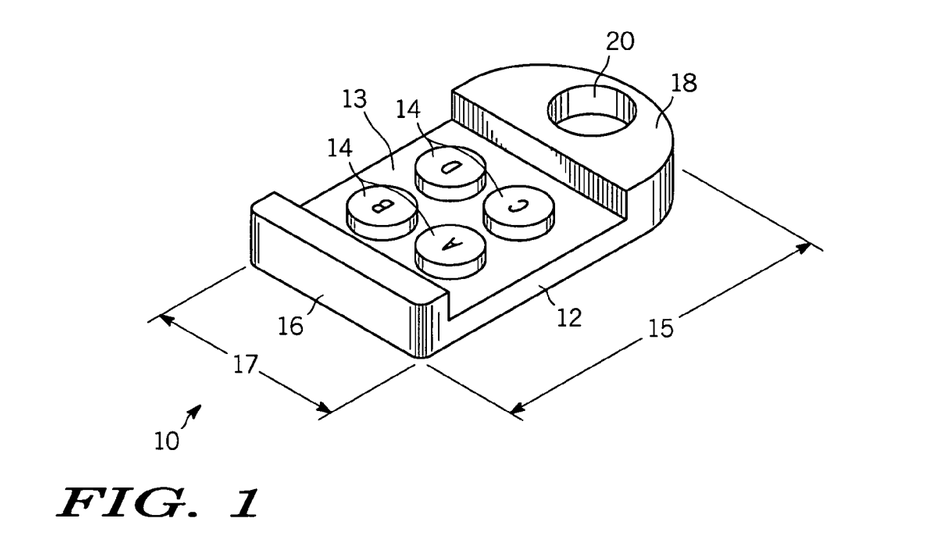
FIG. 1 shows a perspective view of a keyless entry fob according to the present invention.

FIG. 1 shows a perspective view of a remote keyless entry fob 10 according to the present invention. Fob 10 has body portion 12 containing switches 14 or equivalent, which the vehicle operator uses to enter various operating codes, as for example are described in the Reference Application. Such codes can be used to cause the vehicle doors to unlock or lock, lights to turn ON or OFF, engine to start or stop and a variety of other functions depending upon the vehicle control system associated with the wireless fob. Switches 14 are preferably recessed in region 13 of fob 10 so as to avoid being inadvertently actuated. This is conveniently accomplished by providing raised end regions 16, 18 but this is not essential and not intended to be limiting. Alternatively, a removable protective cover (not shown) may also be provided. The exact means of protecting switches 14 from unintended use is not critical and any means of protecting switches 14 from unintended use may be conveniently but not essentially employed. Aperture 20 passing through fob 10 is conveniently provided to allow fob 10 to be easily attached, for example, to a key chain and also, as will be subsequently explained, to provide an alternative means of temporary attachment of fob 10 to a vehicle.

Figure 2A:
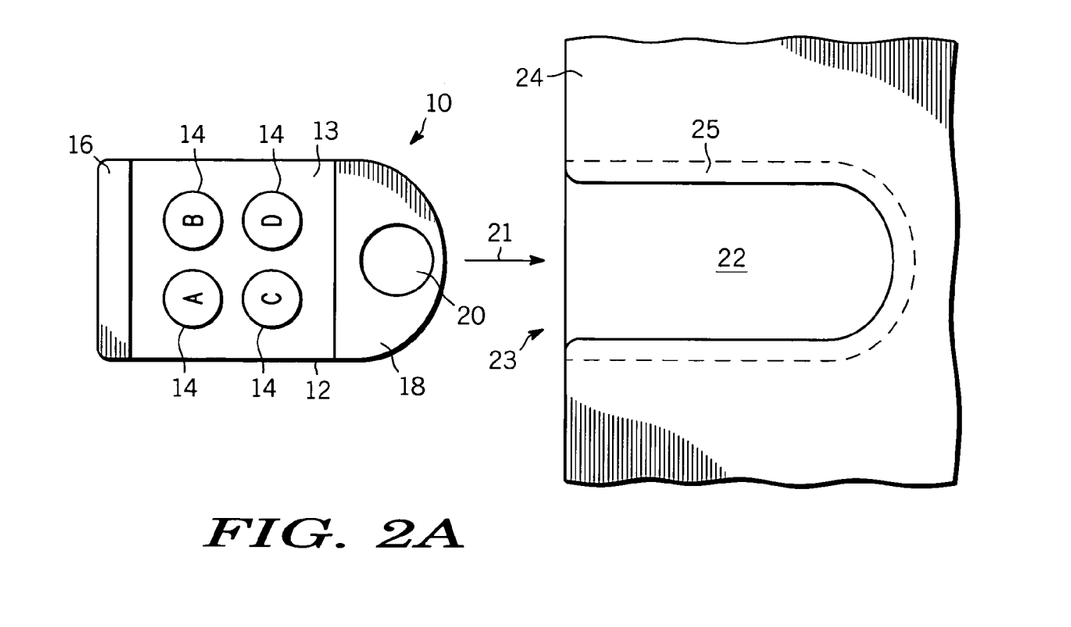
FIG. 2A shows a simplified view of the keyless entry fob of FIG. 1 being removably inserted into a slot in a vehicle structure.
Figure 2B:
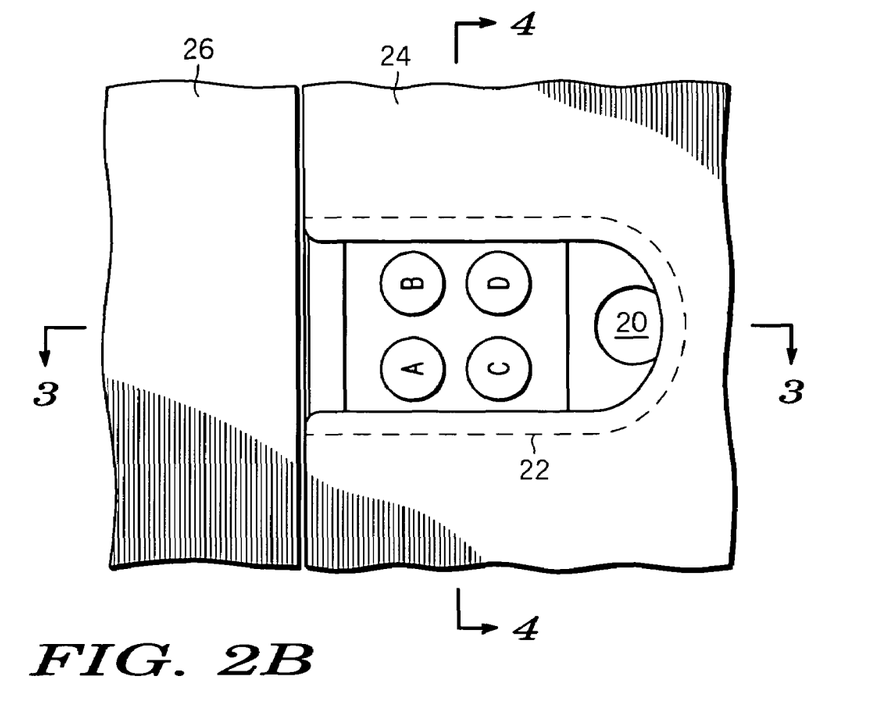
FIG. 2B shows the keyless entry fob of FIG. 1 after insertion into the slot of FIG. 2A, and with the vehicle door closed to temporarily preclude removal of the fob.
Figure 3:
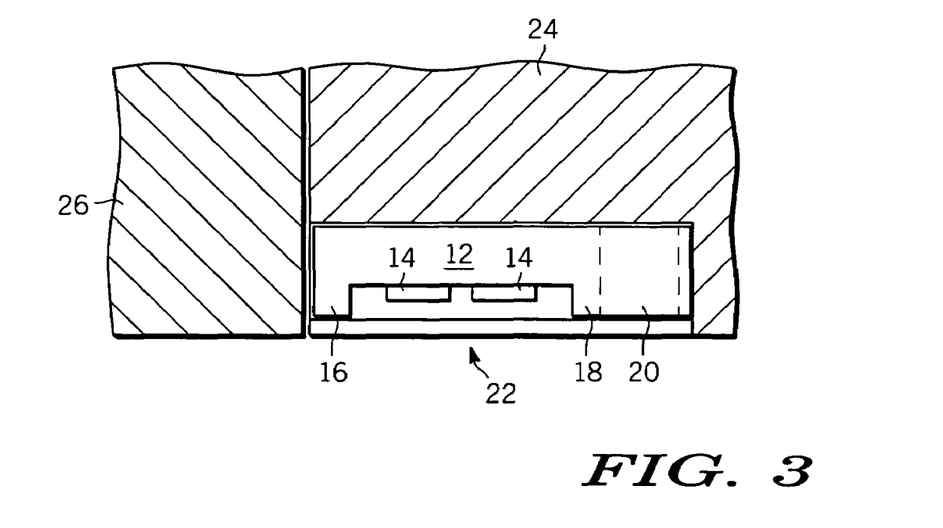
FIG. 3 is a simplified partial cross-sectional view through the structure of FIG. 2B at the location indicated thereon.
Figure 4:
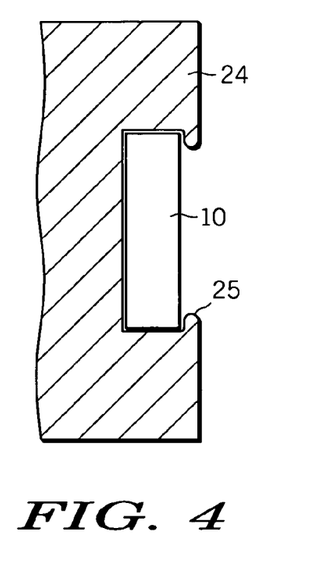
FIG. 4 is a simplified partial cross-sectional view through the structure of FIG. 2B at the location indicated thereon and at right angles to the view of FIG. 3.

FIG. 2A shows a simplified view of a remote keyless entry system wherein fob 10 of FIG. 1 is removably inserted in the direction of arrow 21 into slot 22 in vehicle structure 24, for example, into a slot in the door-frame of the vehicle while the door (not shown) is open. FIG. 2B shows keyless entry fob 10 of FIG. 1 after insertion into slot 22 of FIG. 2A, and with vehicle door 26 closed to temporarily preclude removal of fob 10. It can be seen, however, that switches 14 remain accessible to a user from the exterior of the vehicle through slot 22. FIGS. 3 and 4 are partial cross-sectional views through the assembly of FIG. 2B at the locations indicated. In a preferred embodiment, slot 22 of FIGS. 2A-2B, 3, 4 is preferably oriented approximately horizontally in the door-frame on the side of the car where the door edge and the door frame meet. With door 26 open, opening 23 of slot 22 in door frame 24 is accessible and fob 10 can be slid laterally into slot 22 in door frame 24 as shown by arrow 21, with switches 14 facing outward. When door 26 is closed, opening 23 of slot 22 is now blocked, temporarily preventing fob 10 from being removed from the vehicle. Lip 25 on slot 22 may be of any convenient size so as to retain fob 10 in slot 22, and it should not preferably block access to switches 14. With the arrangement of FIGS. 2-4, once fob 10 is placed in slot 22 and door 26 closed, fob 10 is recessed and well protected against vandalism or accidental damage from something brushing against the side of the vehicle or the like. It may be further protected by placing slot 22 in a depression below the plane of the vehicle skin. It should be appreciated that slot 22 may be configured to permit removal of or access to the fob from the interior of the vehicle even when door or access to 26 is closed.

While region 24 has been identified as a "doorframe" and region 26 as a "door" persons of skill in the art will understand that this is merely for convenience of illustration and not intended to be limiting. Either of regions 24, 26 can be a door or hatch and the other a part of the vehicle shell. What is important is that regions 24, 26 move with respect to each other so that in a first relative position, opening 23 of slot 22 is exposed and in a second relative position opening 23 is blocked or unexposed. Thus, as used herein, the word "door" is intended to include any type of openable panel (e.g., hatch, hood, trunk, window, drawer, door, etc.) and is not limited merely to passenger doors. Further, the words "door" and "frame" are used interchangeably to refer to any two regions of the vehicle with relative motion such that they open and close with respect to each other. It does not matter which is stationary with respect to the vehicle as a whole and which is moveable.

Figure 5:
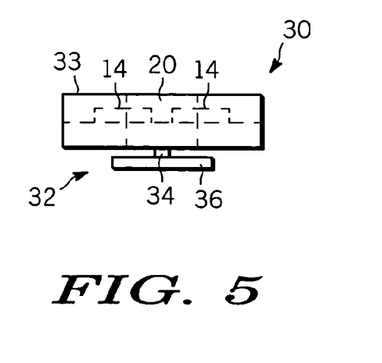
FIG. 5 is an end view of a keyless entry fob according to another embodiment of the present invention.
Figure 6A:
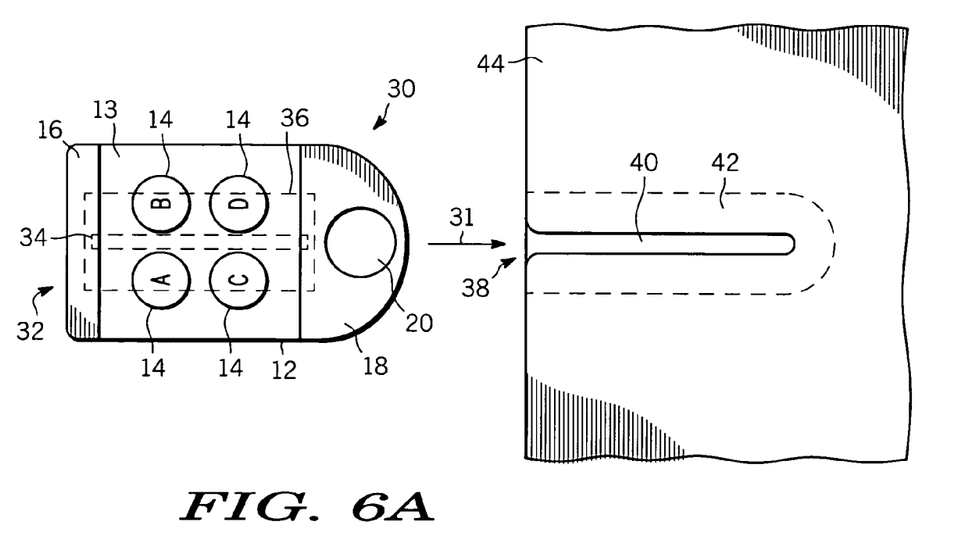
FIG. 6A shows the keyless entry fob of FIG. 5 being removably inserted into a slot in a vehicle structure, analogous to the view of FIG. 2A.
Figure 6B:
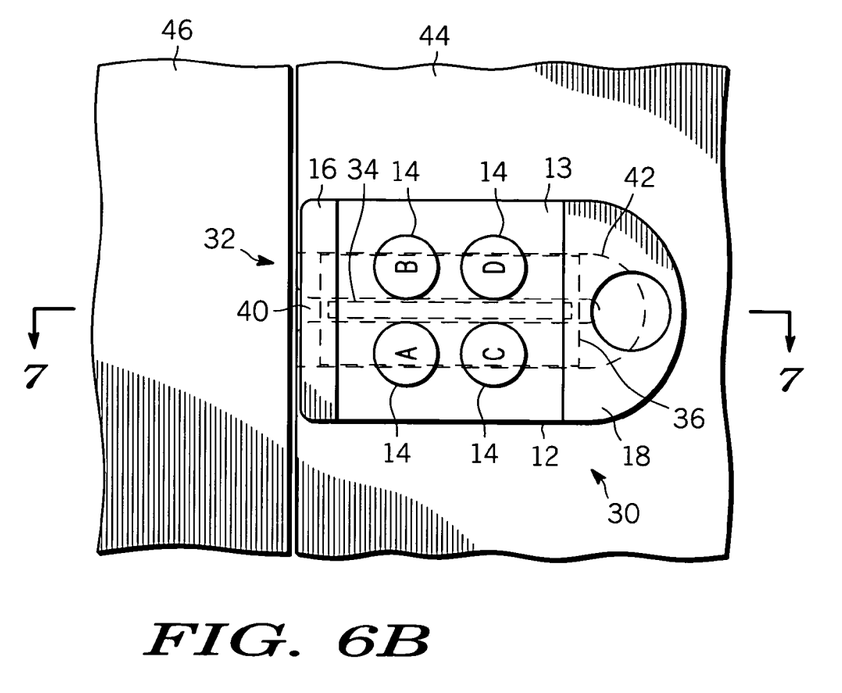
FIG. 6B shows the keyless entry fob of FIG. 5 after insertion into the slot of FIG. 6A, and with the vehicle door closed to temporarily preclude removal of the fob, analogous to the view of FIG. 2B.
Figure 7:
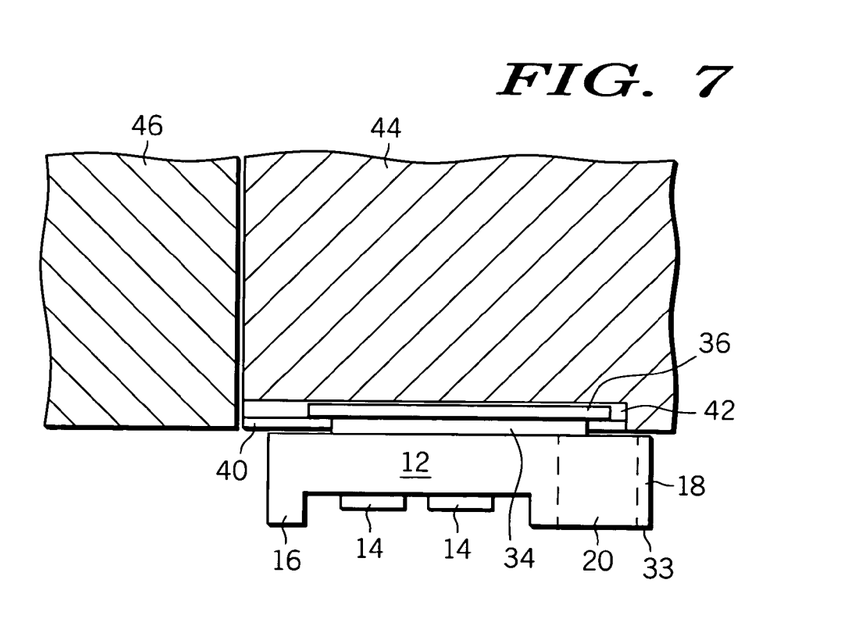
FIG. 7 is a simplified partial cross-sectional view through the structure of FIG. 6B at the location indicated thereon.

FIG. 5 is an end view of keyless entry fob 30 analogous to fob 10 but according to another embodiment of the present invention. FIGS. 6A and 6B are analogous to FIGS. 2A and 2B, respectively, and FIG. 7 is analogous to FIG. 3. These figures illustrate how fob 30 is temporarily attached to a vehicle. Fob 30 has generally T-shaped protrusion 32, preferably on its rear face (other faces are not precluded), with spine 34 and lip 36. Protrusion 32 engages slot opening 38 of doorframe (or door) 44 in the direction of arrow 31, with spine 34 entering narrower slot 40 and lip 36 entering underlying slot 42. While protrusion 32 is depicted as being elongated and comparatively narrow, this is not essential. For example, protrusion 32 can have the form of a button-on-a-stalk or other shape. The exact shape is not important so long as lip 36 is wider than spine 34. FIG. 6B illustrates the arrangement when door (or frame) 46 is closed thereby temporarily preventing removal of fob 30. FIG. 7 is a simplified partial cross-sectional view in the direction indicated in FIG. 6B showing the arrangement of fob 30 with respect to vehicle panels 44, 46 when the "door" is closed. As depicted in FIGS. 6-7, except for protrusion 32, fob 30 protrudes from the vehicle panel. Many variations are possible. For example, fob 30 can be partially or fully recessed by having slots 40, 42 recessed from the outer surface of the vehicle skin so that when fob 30 is inserted therein in the direction of arrow 31 (see FIG. 6A), upper surface 33 of fob 30 is approximately flush with the outer vehicle skin, or if desired recessed therein. Thus, great design and stylistic flexibility is provided by the invented configuration.

Figure 8A:
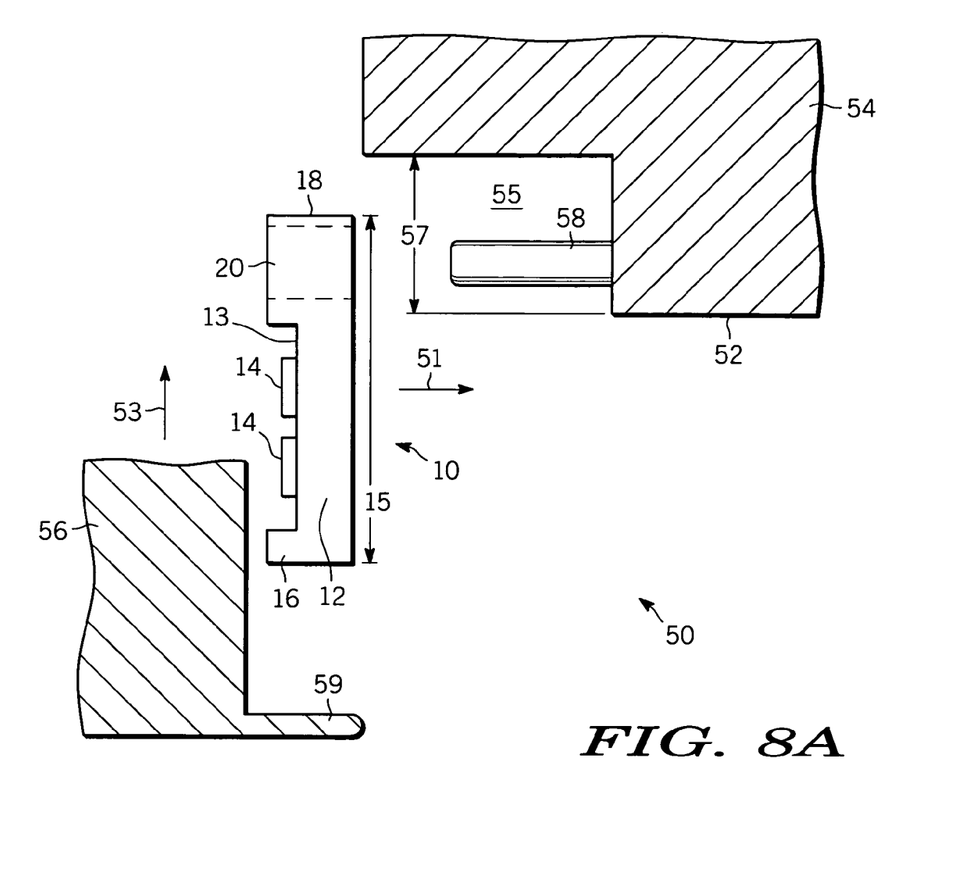
FIG. 8A is a simplified partial cross-sectional view showing the removable attachment of a wireless fob to a vehicle according to a further embodiment of the present invention, while the vehicle door or hatch is open.
Figure 8B:
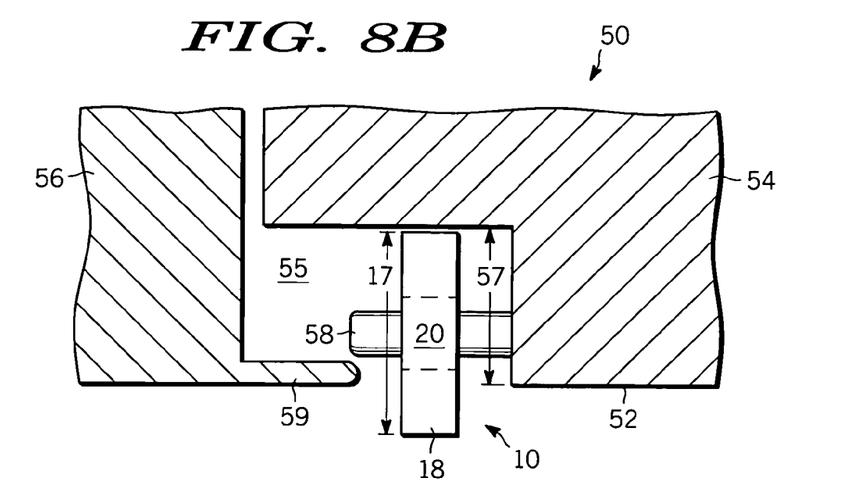
FIG. 8B is a view similar to that of FIG. 8A but after the wireless fob has been attached to the vehicle and the vehicle door or hatch closed to temporarily preclude removal of the wireless fob.

FIG. 8A is a simplified partial cross-sectional view showing the removable attachment of wireless fob 10 to vehicle shell portion 50, according to a further embodiment of the present invention. Fob 10 with through-hole 20 (see FIG. 1) is moved in the direction of arrow 51 so that hole 20 sides over pin 58 mounted in recess 55 on frame portion 54 of vehicle shell 50. In FIG. 8A moveable vehicle door or hatch 56 is open with respect to doorframe 54. Door 56 closes in the direction of arrow 53. FIG. 8B is a view similar to that of FIG. 8A but after the wireless fob 10 has been slipped over pin 58 and vehicle door or hatch 56 closed to temporarily preclude removal of wireless fob 10. When door 56 is closed with respect to frame 54, lip 59 on door portion 56 extends about to the end of pin 58 so that fob 10 cannot be removed from pin 58 while door 56 is closed.

In FIG. 8A where fob 10 is being inserted into recess 55 and over pin 58, fob 10 is conveniently (but not essentially) oriented with its longer dimension 15 about at right angles to outer surface 52 of doorframe 54 and vehicle shell region 50. This makes it easy to grasp fob 10 while it is being slipped over pin 58. In FIG. 8B after fob 10 has been captured by closing door 56, fob 10 conveniently swings down around pin 58 so that its longer dimension 15 is at right angles to the view of FIG. 8B, that is, extending into and out of the plane of FIG. 8B. Thus, in the closed position, fob 10 automatically aligns long dimension 15 approximately parallel to the surface of doorframe 54 and vehicle shell region 50. Depth 57 of recess 55 may be selected so that when fob 10 has swung down into the stowage position it is partially recessed, that is, depth 57 is less than transverse dimension 17 of fob 10 as shown for example in FIG. 8B, or fully recessed, that is, depth 57 equals or exceeds dimension 17, and fob 10 does not protrude outwardly from vehicle panel region 50. Thus, great design and stylistic flexibility is provided by the invented configuration.

Figure 9A:
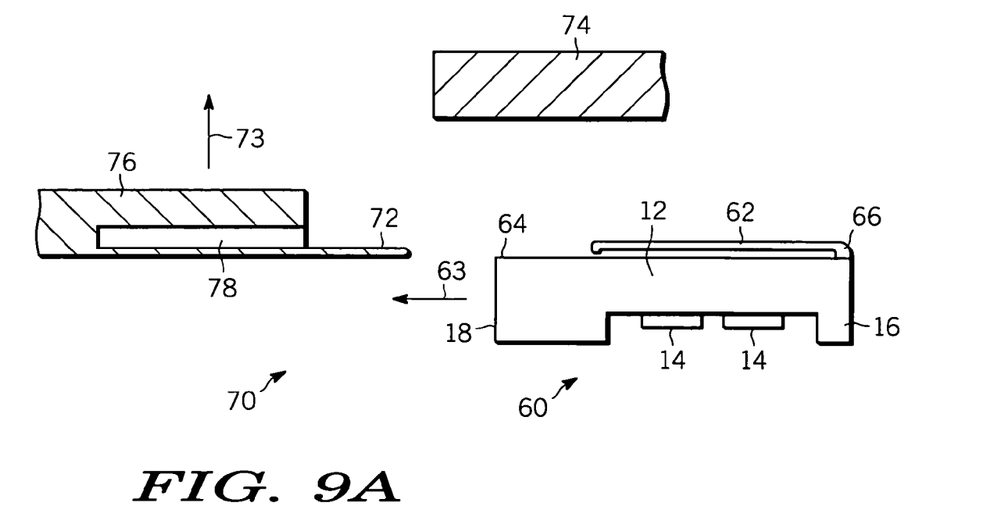
FIG. 9A is a simplified partial cross-sectional view of a wireless fob being removably attached to a vehicle, according to a still further embodiment of the present invention.
Figure 9B:
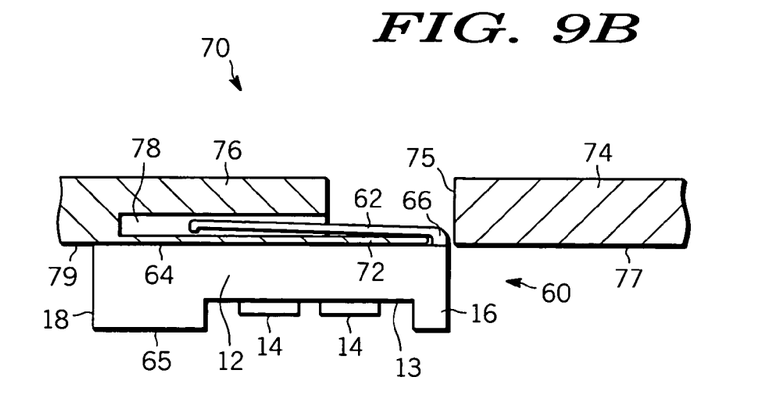
FIG. 9B is a view similar to FIG. 9A but showing the arrangement of FIG. 9A after the vehicle door or hatch is closed.

FIG. 9A is a simplified partial cross-sectional view of wireless fob 60 being removably attached in the direction of arrow 63 to vehicle region 70, according to a still further embodiment of the present invention. FIG. 9B is a simplified view analogous to FIG. 9A but after the vehicle door or hatch is closed. Vehicle region 70 has frame portion 74 and door portion 76 that move relatively in the direction of arrow 73. As previously explained, the words "door" and "frame" are merely used as convenient labels for purposes of explanation and are not intended to be limiting. Either of 74, 76 can be the "door" or the "frame" it does not matter. What is important is that they move relatively as shown by arrow 73 so as to permit fob 60 to be mounted when "open" as in FIG. 9A, and to prevent fob 60 from being removed when "closed" as in FIG. 9B. Fob 60 has clip 62 attached to rear face 64. Clip 62 is moved in the direction of arrow 63, thereby sliding over lip 72 and into recess 78 of door portion 76, as can be seen by comparing FIGS. 9A and 9B. When door 76 is closed into frame 74, surface 75 of frame 74 prevents clip 62 and fob 60 from being removed. Lip 72 is not essential, but merely one way of accomplishing this. Persons of skill in the art will understand based on the teachings herein that lip 72 may be shortened or eliminated by adjusting the depth of slot 78, the location of attachment 66 on fob 60 and/or the relative separation between vehicle portions 74, 76. While fob 60 in FIG. 9B is shown as being external to vehicle surface region 77, 79 when locked into position, this is not essential. By providing slot 78 in a recessed region, outer surface 65 of fob 60 may be made flush with or recessed from or protruding from outer vehicle surfaces 77, 79. Also, while clip 62 is shown as having portion 66 attached to rear surface 64 of fob 60 near end region 16, this is not essential. Clip 62 may be attached to fob 60 at any convenient location and may be a separate metal or plastic clip or may be molded-in. Thus, great design and stylistic flexibility is provided by the invented configuration.

Figure 10A:
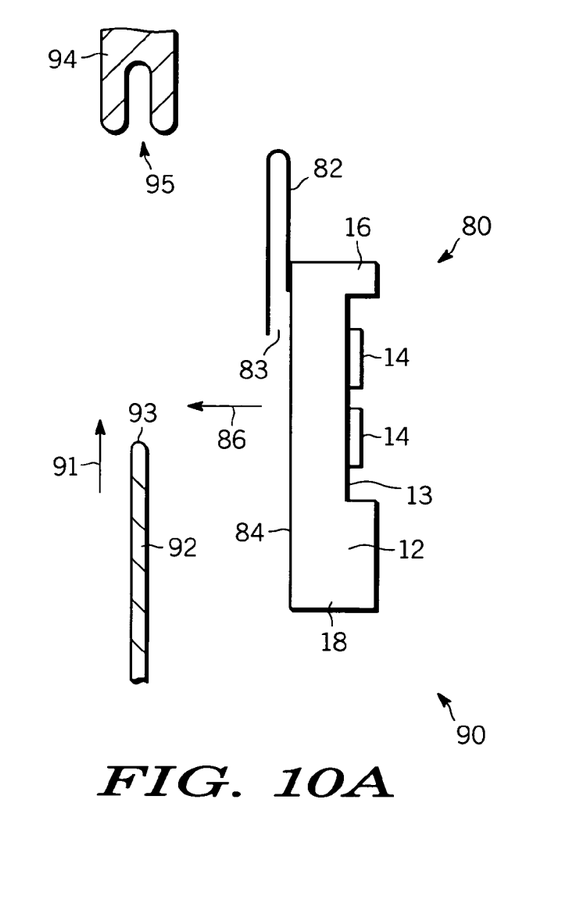
FIG. 10A is a simplified partial cross-sectional view of a wireless fob according to a still further embodiment of the present invention, showing attachment to a window in the open position.
Figure 10B:
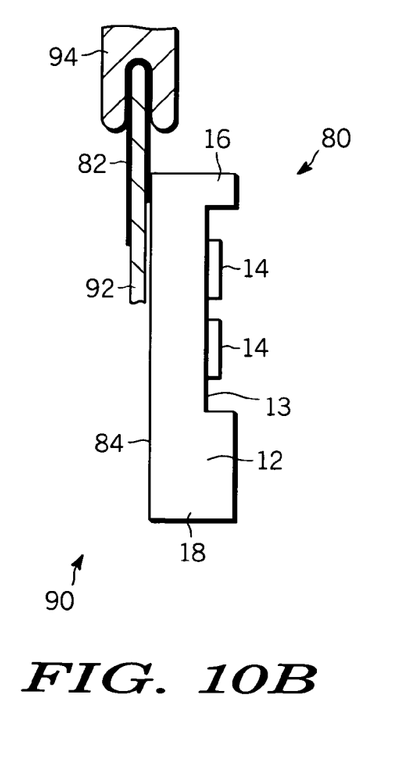
FIG. 10B is view similar to FIG. 10A but with the window closed, thereby temporarily attaching the wireless fob to the vehicle.

FIG. 10A is a simplified partial cross sectional view of wireless fob 80 being attached to vehicle region 90 according to a still further embodiment of the present invention. Vehicle portion 90 includes window (or like structure) 92 that moves in the direction of arrow 91 into window frame 94. FIG. 10A shows the situation when window 92 is open and before fob 80 is placed thereon and FIG. 10B shows the situation after fob 80 has been attached to window 92 and window 92 closed in the direction of arrow 91 into window frame 94. While FIGS. 10A, 10B illustrate the situation where window 92 slides up in the direction of arrow 91 into window frame 94, this is not intended to be limiting and persons of skill in the art will understand that window 92 can open and close in the same manner as for the doors depicted in the prior figures.

Fob 80 has clip 82 attached to rear surface 84. In the preferred embodiment, clip 82 is U-shaped and made of springy metal. However, the exact manner of attachment, location and material of clip 82 are not important so long as sufficient clearance is provided for window 92 to close into its frame with clip 82 mounted on window 92, as shown for example, in FIG. 10B. Referring to FIG. 10A, fob 80 is moved in the direction of arrow 86 so that opening 83 of clip 82 is aligned with upper edge 93 of window 92. Clip 82 is then slid down over window 92 thereby attaching fob 80 to window 92. When upper edge 93 of window 92 is advanced into opening 95 of window frame 94, clip 82 and fob 80 are securely trapped between window 92 and window frame 94. Depending upon the functions provided by the vehicle system controller remotely actuated using switches 14 on fob 80, raising and lowering window 92 may be accomplished using fob 80 from outside the vehicle or using the conventional window controls or window crank from inside the vehicle. Either arrangement works but the capability to raise and lower widow 92 remotely using fob 80 is particularly convenient. Clip 82 is preferably of springy metal attached to body 12 of fob 80 by any convenient means or, for example, molded in during the manufacturer of fob 80. Thus, great design and stylistic flexibility is provided by the invented configuration.

Figure 11A:
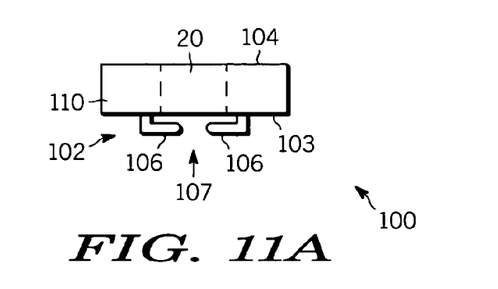
FIG. 11A shows a simplified end view of a wireless fob adapted for temporary attachment to a vehicle or other equipment, according to a yet additional embodiment of the present invention.

FIG. 11A shows a simplified end view of wireless fob 100 having body 110, adapted for temporary attachment to a vehicle, according to a yet additional embodiment of the present invention. Fob 100 is analogous to fob 30 of FIG. 5, except that protrusion 102 from lower surface 103 of FOB 100 has a "C" shape rather than a "T" shape as in FIG. 5. Thus, fob 100 attaches to the vehicle by having lips 106 with slot 107 therebetween slipped over a "T" shaped protrusion (not shown) on the vehicle surface rather than engaging a slot, as was the case with fob 30 of FIG. 5. Persons of skill in the art will understand that this arrangement is the geometric inverse of the arrangement of FIG. 5 but otherwise accomplishes the same result. As with the arrangement of FIG. 5, fob 100 can be external to the surface of the vehicle or have its upper surface 104 flush or even recessed, by recessing the "T" shaped protrusion on the vehicle in a manner analogous to the arrangement discussed in connection with FIG. 5 for fob 30.

Figure 11B:
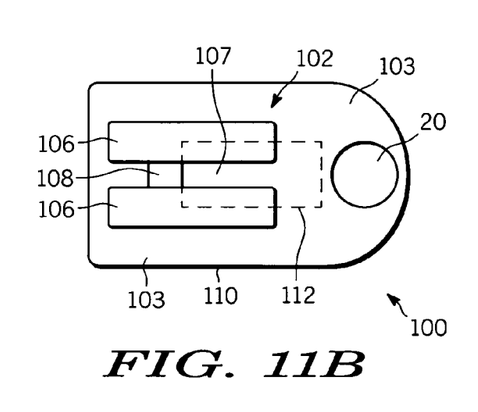
FIGS. 11B and 11C are simplified bottom plan views of the wireless fob of FIG. 11A, illustrating the use of a sliding switch integrated into the fob for altering its mode of operation.
Figure 11C:
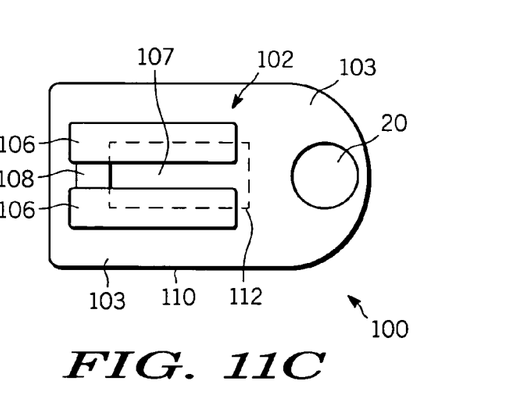

FIGS. 11B and 11C are simplified bottom plan views of wireless fob 100 of FIG. 11A, illustrating the use of sliding switch 108 integrated into fob 100 for altering its mode of operation. Sliding switch 108 is conveniently exposed on lower surface 103 of body 110 of fob 100 between lips 106 of C-shaped protrusion 102, although other locations on lower surface 103 are not precluded. When fob is slipped over T-shaped protrusion 112 (shown as a dashed rectangle on FIGS. 11B, 11C) on the vehicle surface, it pushes switch 108 from the position shown in FIG. 11B to the position shown in FIG. 11C, thereby altering the function of fob 100. This is particularly convenient when the user wants the fob to have one function (e.g., entry of a secret access code) when mounted on the vehicle and another (e.g., conventional lock, unlock, trunk release etc.) when removed from the vehicle. Persons of skill in the art will understand that such an automatic switch function can be incorporated in the other fobs illustrated in connection with FIGS. 2-10 by providing an appropriate protrusion associated with the vehicle slot or pin that actuates a corresponding switch on the fob when the fob is inserted into the slot or slid over the pin on the vehicle. This provides great design and functional flexibility.

Figure 12A:
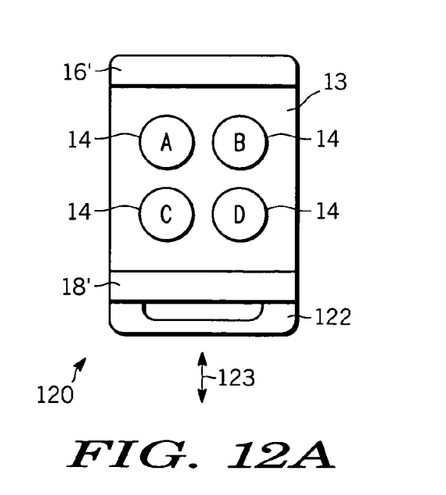
FIGS. 12A and 12B are simplified top plan views of a wireless fob according to a still further embodiment of the present invention incorporating a switch for altering the mode of operation of the wireless fob, where
Figure 12B:
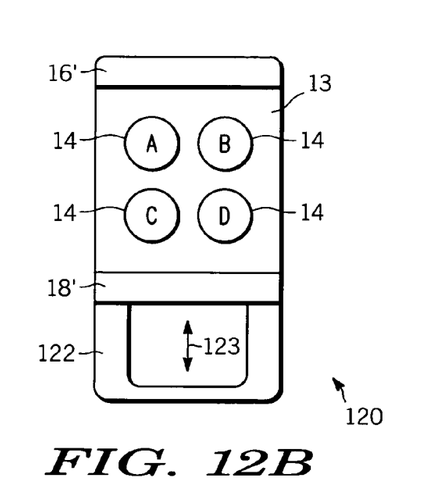

FIGS. 12A and 12B are simplified plan views of wireless fob 120 according to a still further embodiment of the present invention incorporating switch 122 for altering the mode of operation of the wireless fob. FIG. 12A illustrates a first position of switch 122 and FIG. 12B illustrating a second position of switch 122. Switch 122 conveniently slides in and out in the direction of arrow 123 from end region 18' (or 16') although other modes of movement are not precluded. The switch arrangement depicted in FIGS. 12A-12B may be employed with any of the fob attachment means illustrated in FIGS. 2-11. Persons of skill in the art will understand based on the description herein that that switch 122 may forced into the closed (retracted) position when fob 120 is mounted on the vehicle, or forced into the open (extended) position, depending upon the direction of insertion of fob 120 into the vehicle mounting slot or rail. For example, suppose that fob 120 is used with the mounting arrangement of FIGS. 10A-10B, with switch 122 at end 16 of fob 80. Then switch 122 is forced into the retracted position (see FIG. 12A) when window 92 is raised to the closed position. If switch 122 is spring loaded, then it automatically returns to the extended position (FIG. 12B) when window 92 is lowered to release the fob. Similar modifications may be used in connection with the fobs and attachment means illustrated in FIGS. 2-9.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for removably securing a wireless fob in a vehicle, the fob having a control thereon for controlling a vehicle function, the system comprising:
    a first vehicle region having an opening therein for removably receiving the fob; and
    a second vehicle region having first and second positions with respect to said first vehicle region, said opening configured to receive the fob when said second vehicle region is in the first position, said second vehicle region configured to prevent removal of the fob from said opening when said second vehicle region is in said second position, the opening configured to render the control accessible from an exterior of the vehicle when the second vehicle region is in the first position and when the second vehicle region is in the second position.

2. A system according to claim 1 wherein said second vehicle region is a door of the vehicle and said first vehicle region is a doorframe.

3. A system according to claim 1 wherein said first vehicle region is a door of the vehicle and the second vehicle region is a doorframe.

4. A system according to claim 2 wherein said first position is an open position and said second position is a closed position.

5. A system according to claim 2 wherein said opening comprises a slot through which the control is exposed.

6. A system according to claim 2 wherein the first vehicle region comprises a pin for engaging the fob.

7. A method for removable attaching to a vehicle a wireless fob for controlling a function of the vehicle, the vehicle having first and second portions capable of being opened and closed with respect to each other, comprising:
    mating the fob with the first portion when the first and second portions are open so as to expose the control from an exterior of the vehicle; and
    closing the second portion with respect to the first portion to secure the fob in and prevent removal of the fob from said first portion.

8. A method according to claim 7 wherein the mating step comprises mating the fob with a door and wherein the second portion comprises a doorframe.

9. A method according to claim 7 further comprising engaging a switch on the fob to change its electrical function when mating the fob with the first portion.

10. A method according to claim 7 wherein the mating step comprises sliding the fob over a pin mounted on the vehicle.

11. A remote keyless entry system, comprising:
    a fob for controlling a vehicle function;
    a frame, the frame separating an internal volume of the vehicle from an exterior of the vehicle, the frame having an opening therein for removably receiving the fob; and
    a door installed in the frame, the door having a first position and a second position with respect to the frame, the door configured to allow the removal of the fob from the opening when the door is in the first position, the door configured to prevent the removal of the fob from the opening when the door is in the second position, the opening configured to render the control accessible from the exterior of the vehicle when the door is in the second position.

12. A system according to claim 11 wherein said first position is an open position and said second position is a closed position.

13. A system according to claim 11 wherein said opening comprises a slot through which the control is exposed.

14. The system of claim 13 wherein said fob has a lip that engages said slot.

15. The system of claim 14 wherein said fob comprises a protrusion that mates with said frame.

16. A system according to claim 11 wherein the frame comprises a pin for engaging the fob.

\* \* \* \* \*